US012330061B2

(12) United States Patent
Lin

(10) Patent No.: US 12,330,061 B2
(45) Date of Patent: Jun. 17, 2025

(54) MARK PROCESSING METHOD AND APPARATUS, COMPUTER DEVICE, STORAGE MEDIUM, AND PROGRAM PRODUCT

(71) Applicant: Tencent Technology (Shenzhen) Company Limited, Shenzhen (CN)

(72) Inventor: Lingyun Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 272 days.

(21) Appl. No.: 17/980,443

(22) Filed: Nov. 3, 2022

(65) Prior Publication Data

US 2023/0059116 A1  Feb. 23, 2023

Related U.S. Application Data

(63) Continuation of application No. PCT/CN2021/142880, filed on Dec. 30, 2021.

(30) Foreign Application Priority Data

Jan. 21, 2021  (CN) .................. 202110084112.X

(51) Int. Cl.
  *A63F 13/5372*  (2014.01)
  *A63F 13/52*  (2014.01)
(52) U.S. Cl.
  CPC .......... *A63F 13/5372* (2014.09); *A63F 13/52* (2014.09); *A63F 2300/306* (2013.01); *A63F 2300/6653* (2013.01)
(58) Field of Classification Search
  CPC .............. A63F 13/537; A63F 13/5372; A63F 13/5375; A63F 13/5378; A63F 13/55;
  (Continued)

(56) References Cited

U.S. PATENT DOCUMENTS 8,550,919 B2 * 10/2013 Kajii ................. A63F 13/52
  463/43
9,522,334 B2 * 12/2016 Kajii ............... A63F 13/5372
  (Continued)

FOREIGN PATENT DOCUMENTS

CN  108525300 A  9/2018
CN  109701280 A  5/2019
  (Continued)

OTHER PUBLICATIONS

CN 108525300 A, machine translation, copyright 2024 Clarivate Analytics, downloaded from PE2E Search, Sep. 20, 2024.*

(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

This application provides a mark processing method performed by a computer device. The method includes: displaying a display picture of a virtual environment; displaying an aiming prompt mark on the display picture of the virtual environment, the aiming prompt mark being used for indicating a target aimed position at which a target virtual object in the virtual environment aims; displaying a position prompt mark on the display picture of the virtual environment according to a first transparency, the position prompt mark being used for indicating a target environment position in the virtual environment; and adjusting the transparency of the position prompt mark in response to a change in relative positions between the aiming prompt mark and the position prompt mark.

20 Claims, 13 Drawing Sheets

(58) Field of Classification Search
CPC ........ A63F 13/56; A63F 13/57; A63F 13/573; A63F 13/52; A63F 2300/306; A63F 2300/6653; A63F 13/22; A63F 13/5255; A63F 13/837; A63F 13/53
See application file for complete search history.

(56) References Cited

U.S. PATENT DOCUMENTS

| | | | |
|---|---|---|---|
| 2003/0078105 A1* | 4/2003 | Hao | A63F 13/53 463/51 |
| 2011/0190063 A1* | 8/2011 | Kajii | A63F 13/48 463/43 |
| 2013/0344967 A1* | 12/2013 | Kajii | A63F 13/795 463/42 |
| 2018/0253891 A1 | 9/2018 | Dohta et al. | |
| 2023/0059116 A1* | 2/2023 | Lin | A63F 13/537 |

FOREIGN PATENT DOCUMENTS

| | | |
|---|---|---|
| CN | 110115838 A | 8/2019 |
| CN | 111659117 A | 9/2020 |
| CN | 112717392 A | 4/2021 |
| CN | 110115838 B | 10/2021 |
| JP | 2001286678 A | 10/2001 |
| JP | 2006061717 A | 3/2006 |
| JP | 2008272123 A | 11/2008 |
| JP | 2011255119 A | 12/2011 |
| TW | 201034727 A | 10/2010 |
| WO | WO 2008052255 A1 | 5/2008 |

OTHER PUBLICATIONS

CN 110115838 A, machine translation, copyright 2024 Clarivate Analytics, downloaded from PE2E-Search, Sep. 20, 2024.*
CN 111659117 A, machine translation, copyright 2024 Clarivate Analytics, downloaded from PE2E-Search, Sep. 20, 2024.*
Tencent Technology, WO, PCT/CN2021/142880, Mar. 29, 2022, 5 pgs.
Tencent Technology, IPRP, PCT/CN2021/142880, Jul. 20, 2023, 6 pgs.
Tencent Technology, ISR, PCT/CN2021/142880, Mar. 29, 2022, 3 pgs.
Tencent Technology, Japanese Office Action, JP Patent Application No. 2023-527686, May 29, 2024, 6 pgs.

* cited by examiner

MARK PROCESSING METHOD AND APPARATUS, COMPUTER DEVICE, STORAGE MEDIUM, AND PROGRAM PRODUCT

CROSS-REFERENCE TO RELATED APPLICATIONS

This application is a continuation application of PCT Patent Application No. PCT/CN2021/142880, entitled "MARK PROCESSING METHOD AND APPARATUS, AND COMPUTER DEVICE, STORAGE MEDIUM AND PROGRAM PRODUCT" filed on Dec. 30, 2021, which claims priority to Chinese Patent Application No. 202110084112.X, filed with the State Intellectual Property Office of the People's Republic of China on Jan. 21, 2021, and entitled "MARK DISPLAY METHOD AND APPARATUS, TERMINAL DEVICE, AND STORAGE MEDIUM", all of which are incorporated herein by reference in their entirety.

FIELD OF THE TECHNOLOGY

Embodiments of this application relate to the field of computer technologies, and in particular, to a mark processing method and apparatus, a computer device, a storage medium, and a program product.

BACKGROUND OF THE DISCLOSURE

In response to the development of computer technologies, increasingly abundant content can be displayed on a display picture of an application, especially a gaming application.

In the related art, in a display picture of some games, some marks are displayed to provide information related to the games for users. In the related art, these marks sometimes seriously block a display picture of a virtual environment under the marks. It is difficult for users to recognize the display picture blocked by the marks. As a result, a time required for the users to acquire information from the virtual environment is increased, affecting the efficiency of human-computer interaction.

SUMMARY

A mark processing method is provided, which is performed by a computer device and includes:
  displaying a display picture of a virtual environment;
  displaying an aiming prompt mark on the display picture of the virtual environment, the aiming prompt mark being used for indicating a target aimed position at which a target virtual object in the virtual environment aims;
  displaying a position prompt mark on the display picture of the virtual environment according to a first transparency, the position prompt mark being used for indicating a target environment position in the virtual environment; and
  adjusting the transparency of the position prompt mark in response to a change in relative positions between the aiming prompt mark and the position prompt mark.
A mark processing apparatus is provided, including:
  a picture display module, configured to display a display picture of a virtual environment;
  a mark display module, configured to display an aiming prompt mark on the display picture of the virtual environment, the aiming prompt mark being used for indicating a target aimed position at which a target virtual object in the virtual environment aims;
  the mark display module being further configured to display a position prompt mark on the display picture of the virtual environment according to a first transparency, the position prompt mark being used for indicating a target environment position in the virtual environment; and
  a transparency adjustment module, configured to adjust the transparency of the position prompt mark in response to a change in relative positions between the aiming prompt mark and the position prompt mark.

A computer device is provided, including a memory and one or more processors, the memory storing computer-readable instructions, the computer-readable instruction, when executed by the one or more processors, causing the computer device to implement the foregoing mark processing method.

One or more non-transitory computer-readable storage media are provided, storing computer-readable instructions, the computer-readable instructions, when executed by one or more processors of a computer device, causing the computer device to implement the foregoing mark processing method.

According to an aspect of the embodiments of this application, a computer program product or a computer program is provided, including computer instructions, the computer instructions being stored in a computer-readable storage medium. A processor of a computer device reads the computer instructions from the computer-readable storage medium, and executes the computer instructions, to cause the computer device to perform the foregoing mark processing method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with this application. Instead, they are merely examples of the method according to some aspects of this application as recited in the appended claims.

Figure 1:
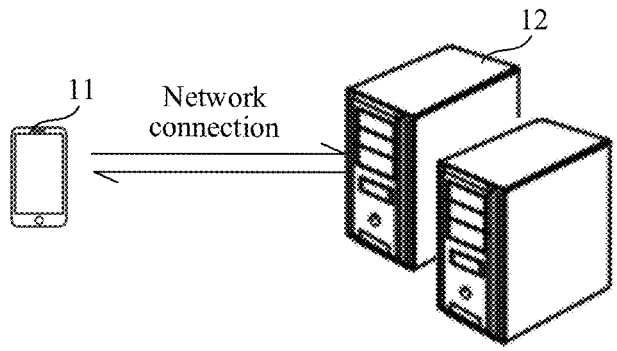
FIG. 1 is a schematic diagram of an implementation environment according to an embodiment of this application.

FIG. 1 is a schematic diagram of an implementation environment according to an embodiment of this application. The implementation environment may be implemented as a mark processing system. The system 10 may include a terminal 11.

A target application, such as a client of the target application, is installed and run in the terminal 11 and the client is logged with a user account. The terminal is an electronic device having data computing, processing and storage capabilities. The terminal may be a smartphone, a tablet computer, a personal computer (PC), a wearable device, or the like. This is not limited in the embodiments of this application. In some embodiments, the terminal is a mobile terminal device having a touch display screen, and a user can implement man-machine interaction through the touch display screen. The target application program may be a game application program, such as a survival game application program, a location based service (LBS) game application program, a multiplayer online battle arena (MOBA) game application program, or the like. This is not limited in the embodiments of this application. The target application program may also be a social application program, a payment application program, a video application program, a music application program, a shopping application program, a news application program, or any other application program that has a mark processing function. In the method provided in the embodiments of this application, steps may be performed by a terminal 11, for example, a client running in the terminal 11.

The virtual environment is a scene displayed (or provided) when a client of a target application program (such as a game application program) runs on a terminal. The virtual environment refers to a scene created for a virtual object to perform activities (such as game competition), such as a virtual house, a virtual island, a virtual map, or the like. The virtual environment may be a simulated environment of a real world, or may be a semi-simulated and semi-fictional environment, or may be a completely fictional environment. The virtual environment may be a two-dimensional virtual environment, a 2.5-dimensional virtual environment, or a three-dimensional virtual environment. This is not limited in the embodiments of this application. A virtual object is a virtual character controlled by a user account in a target application program. For example, the target application program is a game application program. The virtual object is a game character controlled by the user account in the game application program. The virtual object may be in a human form or animal, cartoon, or other forms, which is not limited in the embodiments of this application. The virtual object may be presented in a three-dimensional form or a two-dimensional form, which is not limited in the embodiments of this application. In some embodiments, when the virtual environment is a 3D virtual environment, the virtual object may be a 3D model created based on a skeletal animation technology. The virtual object has its own shape and size in the three-dimensional virtual environment, and occupies some space in the three-dimensional virtual environment. In some embodiments, the target application may have a function to simulate a real physical environment. In the virtual environment, movement laws of various virtual elements (such as virtual objects) conform to or approximate real physical laws.

In some embodiments, the system 10 further includes a server 12. The server 12 establishes a communicative connection (such as a network connection) to the terminal 11, and the server 12 is configured to provide a background service for the target application. The server may be an independent physical server, a server cluster composed of a plurality of physical servers or a distributed system, or a cloud server providing a cloud computing service.

In an embodiment, the terminal may display a display picture of the virtual environment; display an aiming prompt mark on the display picture of the virtual environment, the aiming prompt mark being used for indicating a target aimed position at which a target virtual object in the virtual environment aims; display a position prompt mark on the display picture of the virtual environment according to a first transparency, the position prompt mark being used for indicating a target environment position in the virtual environment; and adjust the transparency of the position prompt mark in response to a change in relative positions between the aiming prompt mark and the position prompt mark.

A mark processing method provided in the embodiments of this application is applicable to a scenario of displaying on a display screen, and is further applicable to a display scenario such as augmented reality (AR) and a virtual reality (VR). This is not specifically limited in the embodiments of this application.

The technical solution of this application is described below by using several embodiments.

Figure 2:
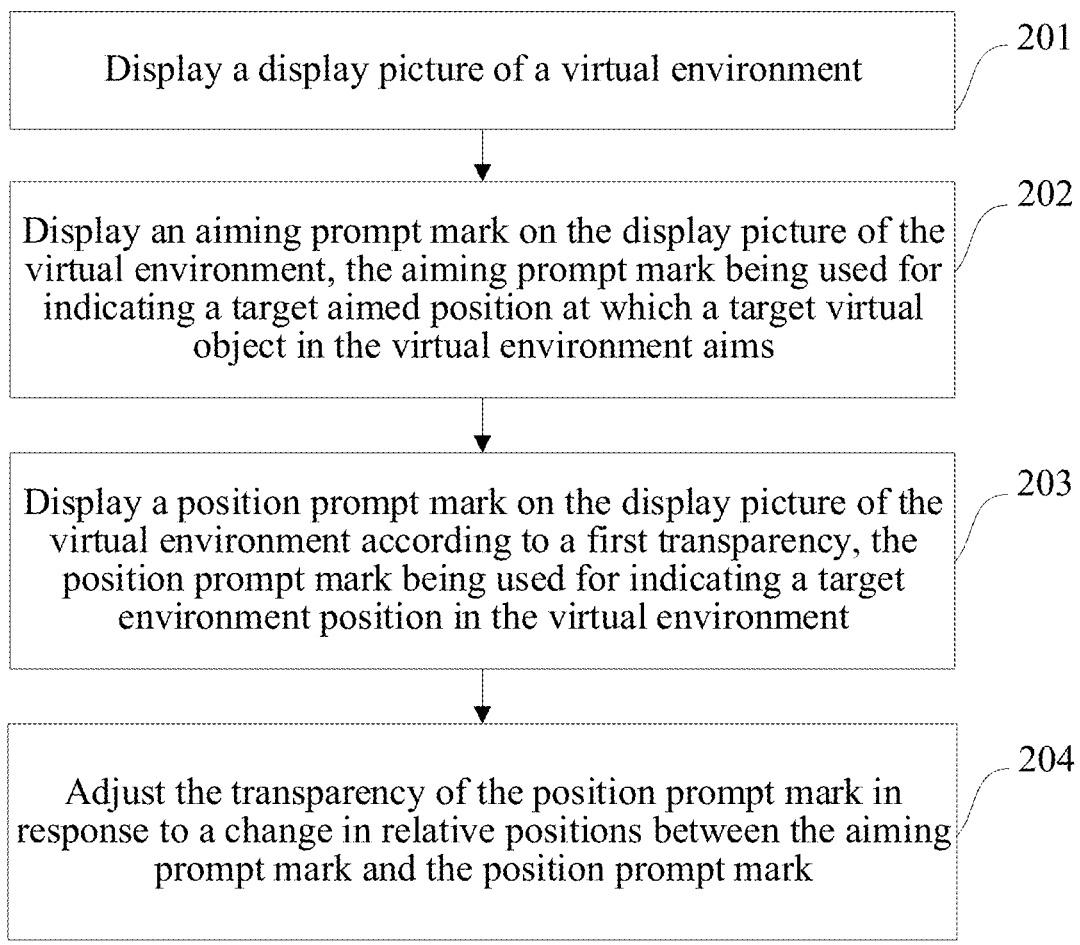
FIG. 2 is a flowchart of a mark processing method according to an embodiment of this application.

FIG. 2 is a flowchart of a mark processing method according to an embodiment of this application. The method may be performed by the terminal 11 described above, or may be performed by the server 12, or may be jointly performed by the terminal 11 and the server 12. In this embodiment, the method is applied to the terminal 11 described above, for example. The method may include the following steps (201-204):

Step 201: Display a display picture of a virtual environment.

For description of the virtual environment, refer to the above content, and the details are not repeated herein.

In some embodiments, the display picture of the virtual environment displayed on the terminal is bottommost display picture layer of a user interface. A user interface (UI) layer exists above the display picture of the virtual environment. The UI layer is configured to display UI elements such as a plurality of marks and virtual controls. The terminal displays the virtual controls and the respective marks on the UI layer above the display picture of the displayed virtual environment. A user may control a virtual object through the virtual controls, for example, control the virtual object to move or to change poses, operate virtual props, and use skills. The user may acquire prompt information through the marks to control the virtual object.

Step 202: Display an aiming prompt mark on the display picture of the virtual environment, the aiming prompt mark being used for indicating a target aimed position at which a target virtual object in the virtual environment aims.

In some embodiments, the terminal displays the aiming prompt mark above the display picture of the virtual environment, the target virtual object in the virtual environment displayed on the terminal is a corresponding virtual object controlled by the user, or may be considered as a virtual role representing the current user. In some embodiments, the terminal displays the aiming prompt mark and the target aimed position in an overlap manner, and a position corresponding to a center of the aiming prompt mark is the target aimed position. In other embodiments, the aiming prompt mark or the position corresponding to the center of the aiming prompt mark is near the target aimed position.

In some embodiments, the target aimed position is a position where a virtual shooter held by the target virtual object aims. In an example, the aiming prompt mark is a sight bead (also referred to as an aim point) of the virtual shooter.

Step 203: Display a position prompt mark on the display picture of the virtual environment according to a first transparency, the position prompt mark being used for indicating a target environment position in the virtual environment.

In some embodiments, the terminal displays the position prompt mark on the display picture of the virtual environment. When relative positions between the aiming prompt mark and the position prompt mark do not change, the terminal displays the position prompt mark at a current transparency (that is, a first transparency). In some embodiments, the terminal displays the position prompt mark and the target environment position in an overlap manner, and a position corresponding to a center of the position prompt mark is the target environment position. In other embodiments, the position prompt mark or the position corresponding to the center of the position prompt mark is near the target environment position. In some embodiments, the position prompt mark is a circle, a triangle, a square, a rectangle, a rhombus, or the like. This is not specifically limited in this embodiment of this application. The position prompt mark may alternatively be a mark obtained by combining marks of different shapes.

In an example, the position prompt mark may be created by the user corresponding to the target virtual object, and the position prompt mark is visible only to the user corresponding to the target virtual object. Alternatively, the position prompt mark is visible only to the user corresponding to the target virtual object and a user corresponding to a virtual object on a side as the target virtual object. Alternatively, the position prompt mark is visible to users corresponding to all virtual objects in a current game.

In another example, the position prompt mark is automatically generated by the target application.

In some embodiments, the target environment position includes a fixed position and a movable position. The fixed position is a position that does not change relative to the virtual environment, and the movable position is a position of a virtual body or a virtual object movable relative to the virtual environment. When the target environment position is the fixed position, such as a position of an unmovable virtual stone, a virtual house, a virtual island, or a virtual tree in the virtual environment, the target environment position does not change. When the target environment position is the movable position, such as a position of a movable virtual object, a virtual vehicle, or a virtual shooter in the virtual environment, the target environment position changes when the position of the movable virtual object, the virtual vehicle, or the virtual shooter changes. Obviously, the display position of the position prompt mark also changes with the target environment position.

In some embodiments, the step 203 includes the following sub-steps:

1. Determine whether the target environment position is within a field of view of the target virtual object, the field of view being used for indicating a virtual environment region currently observed by the target virtual object.

2. Display the position prompt mark at the target environment position when the target environment position is within the field of view.

3. Display the position prompt mark on an edge of the display picture of the virtual environment when the target environment position is outside the field of view.

In this implementation, if the target environment position displayed on the terminal is within the current observation field of view of the target virtual object, which indicates that the user can see the target environment position from an angle of view of the target virtual object in the display picture of the currently displayed virtual environment, the position prompt mark is displayed at the target environment position, so that the user pays attention to the target environment position. If the target environment position is outside the field of view, which indicates that the user cannot see the target environment position from the angle of view of the target virtual object in the display picture of the currently displayed virtual environment, the position prompt mark is displayed on the edge of the display picture of the virtual environment, to help the user understand a range of the target environment position or understand a position and a direction of the target environment position relative to the target virtual object. Displaying the position prompt mark in the display picture of the virtual environment through dynamic adjustment avoids a problem regarding human-computer interaction caused by a dull or fixed display manner, and can effectively improve the efficiency of human-computer interaction.

In some embodiments, when the display picture of the virtual environment does not completely coincide with a display picture of the UI layer where the position prompt mark is located, if the target environment position is outside the field of view, the terminal displays the position prompt mark on an edge of the display picture of the UI layer.

In some embodiments, a horizontal angle of the field of view is 120°, 150°, 180°, or the like. In some embodiments, the horizontal angle of the field of view may be other values, and the specific value of the horizontal angle of the field of view is set by relevant technical personnel according to an actual situation. This is not specifically limited in this embodiment of this application.

Figure 3:
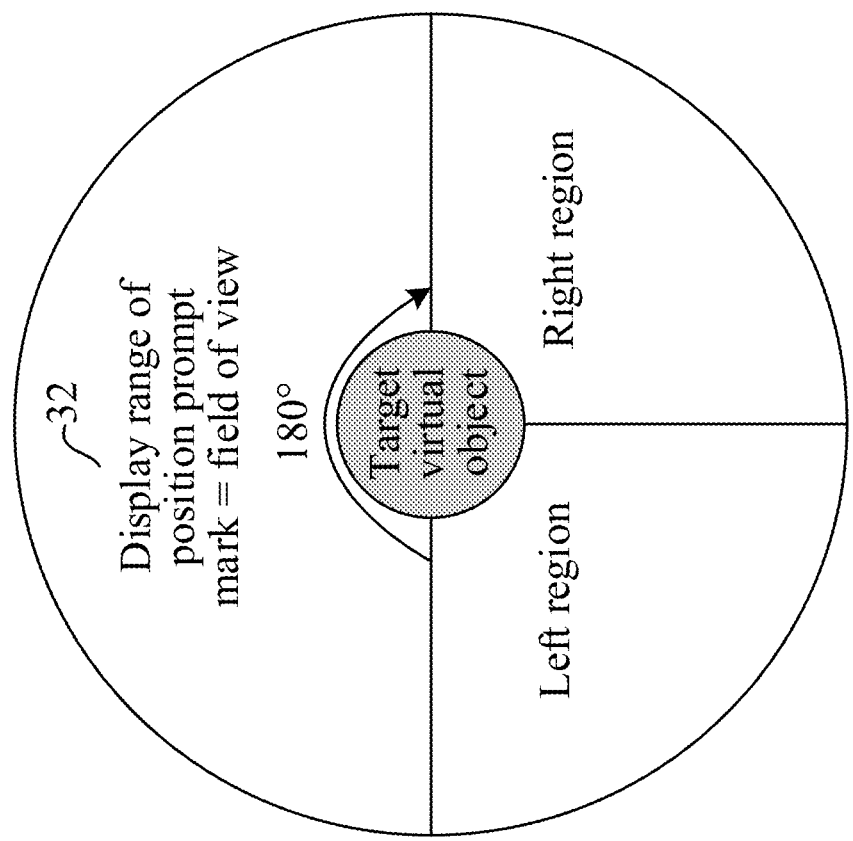
FIG. 3 is a schematic diagram of a field of view according to an embodiment of this application.
Figure 3:
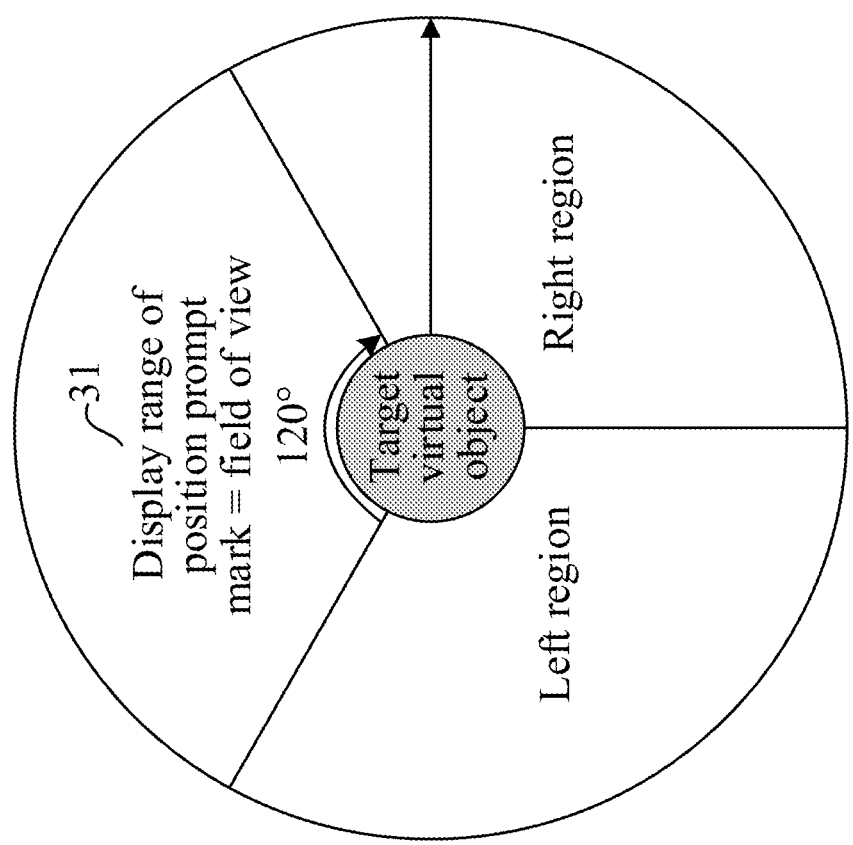

In some embodiments, when the target application is a game application, the horizontal angle of the field of view depends on a game mode. In an example, as shown in FIG. 3, a horizontal angle of a field of view 31 in a first-person shooting (FPS) mode is 120°, and a horizontal angle of a field of view 32 in a third-personal shooting (TPS) mode is 180°.

In other embodiments, the horizontal angle of the field of view is set by the user. For example, the user may set the horizontal angles of the fields of view respectively corresponding to the FPS mode and the TPS mode, thereby enriching the game content.

Figure 4:
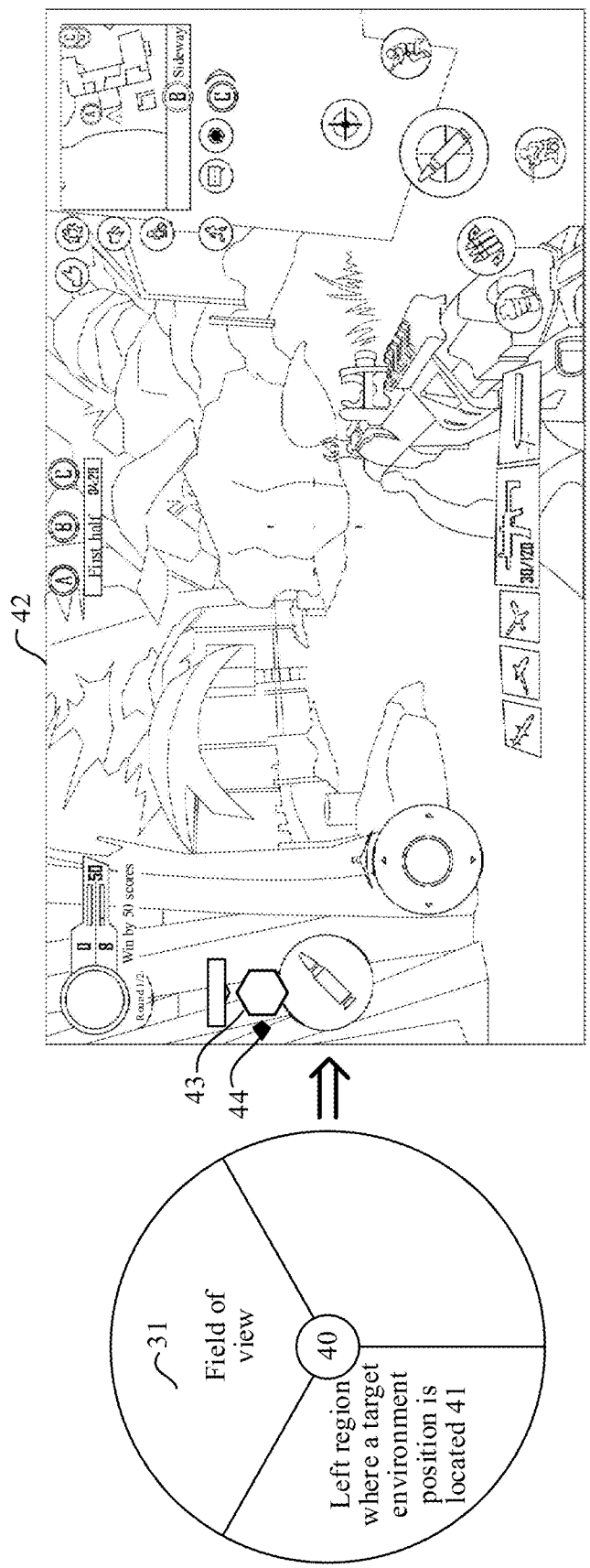
FIG. 4 is a schematic display diagram of a position prompt mark according to an embodiment of this application.

In some embodiments, as shown in FIG. 4, the terminal displays a position prompt mark 43 on a left edge of a display picture 42 of the virtual environment if the target environment position is outside the field of view 31 and the target environment position is located in a left region 41 of a target virtual object 40.

Figure 5:
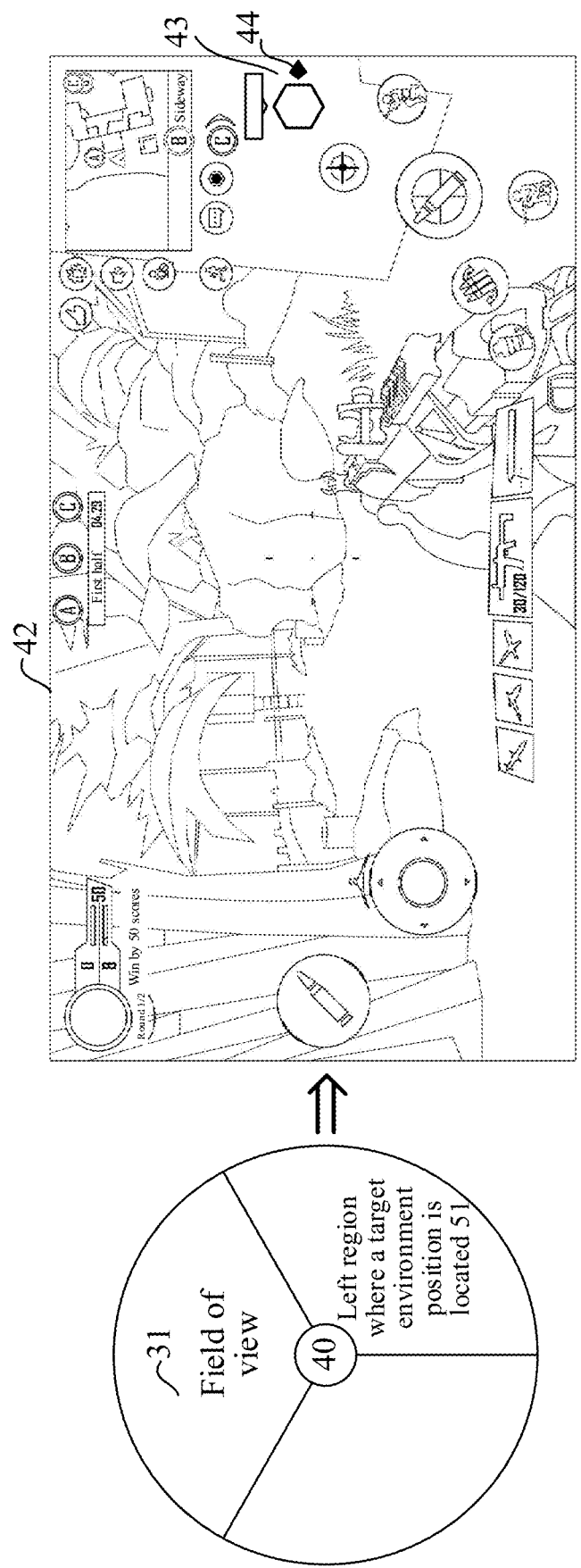
FIG. 5 is a schematic display diagram of a position prompt mark according to another embodiment of this application.

In other embodiments, as shown in FIG. 5, the terminal displays the position prompt mark 43 on a right edge of the display picture 42 of the virtual environment if the target environment position is outside the field of view 31 and the target environment position is located in a right region 51 of the target virtual object 40.

Figure 6:
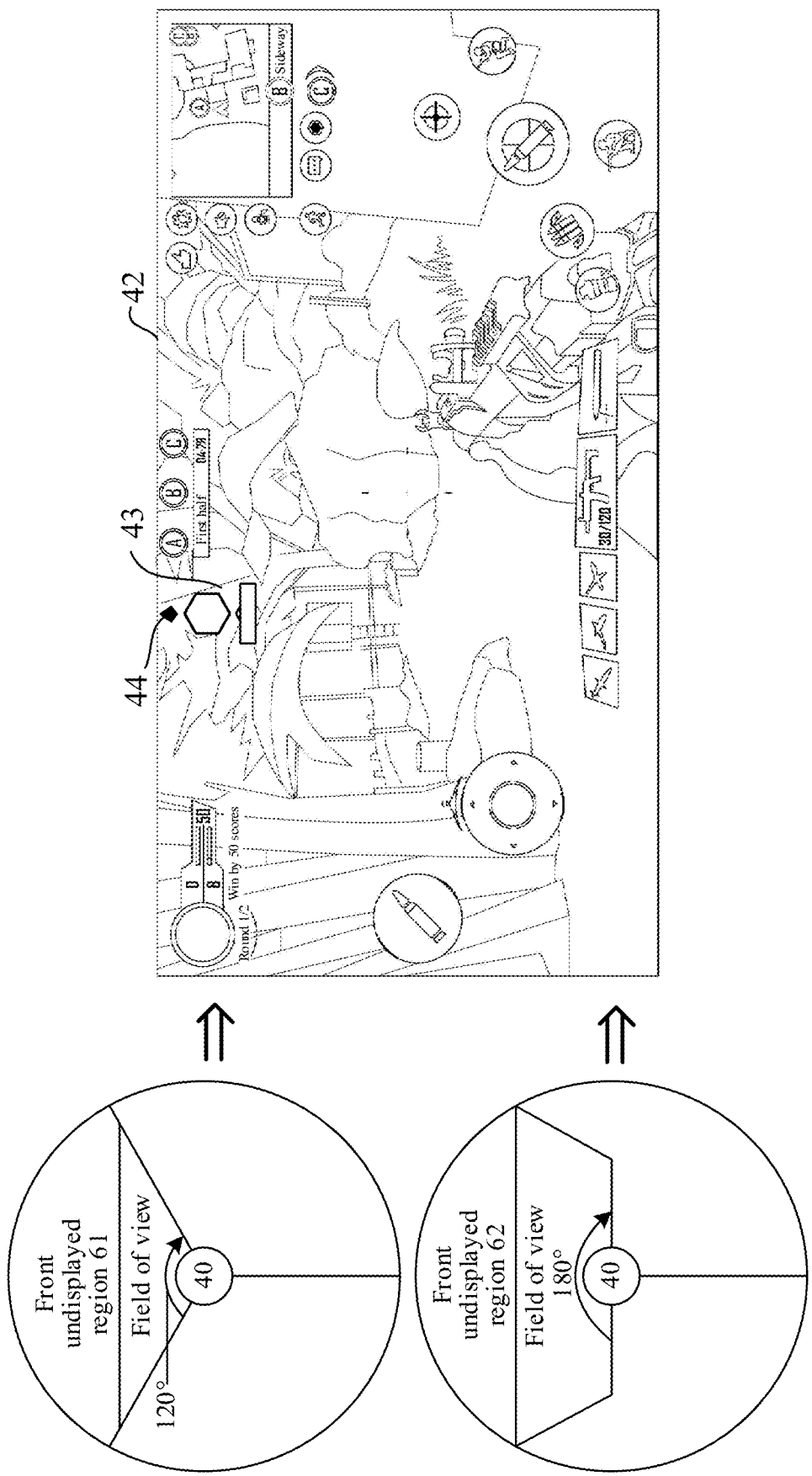
FIG. 6 is a schematic display diagram of a position prompt mark according to another embodiment of this application.

In other embodiments, as shown in FIG. 6, the terminal displays the position prompt mark 43 on an upper edge of the display picture 42 of the virtual environment if the target environment position is outside the field of view and the target environment position is in a front undisplayed region of the target virtual object 40. In some embodiments, the target environment position is located in a front undisplayed region 61 when the horizontal angle of the field of view is 120°, and the target environment position is located in a front undisplayed region 62 when the horizontal angle of the field of view is 180°.

In some embodiments, as shown in FIG. 4, FIG. 5, and FIG. 6, the position prompt mark 43 includes a direction mark 44, the direction mark 44 pointing to the target environment position. In an example, the direction mark 44 points to a direction of the target environment position when the target environment position is out of the field of view. The direction mark 44 points to the target environment position when the target environment position is within the field of view.

Figure 7:
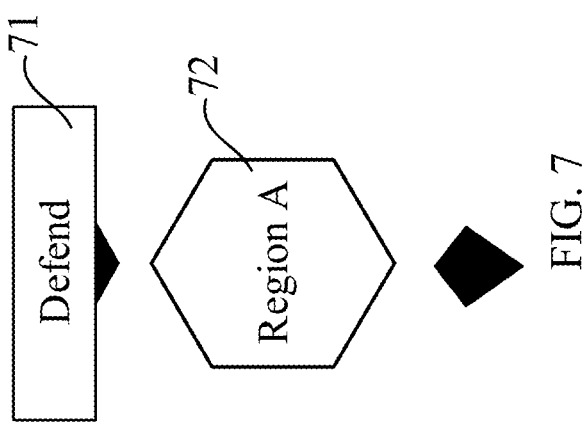
FIG. 7 is a schematic diagram of a position prompt mark according to an embodiment of this application.

In some embodiments, as shown in FIG. 7, the position prompt mark includes an operation prompt mark 71 and a region prompt mark 72. The operation prompt mark 71 is used for prompting operations the user is required to control the target virtual object to perform, and the region prompt mark 72 is used for prompting the user the region of the target environment position.

In an example, when the target environment position is required to be blasted, the operation prompt mark 71 is used for prompting the user to control the target virtual object to perform a defend operation or an attack operation.

In another example, the virtual environment is divided into a plurality of regions, which are respectively represented by letters A, B, C, D, and the like. When the target environment position is in the region A, the region prompt mark 72 displays the letter "A".

Step 204: Adjust the transparency of the position prompt mark in response to a change in relative positions between the aiming prompt mark and the position prompt mark.

Figure 8:
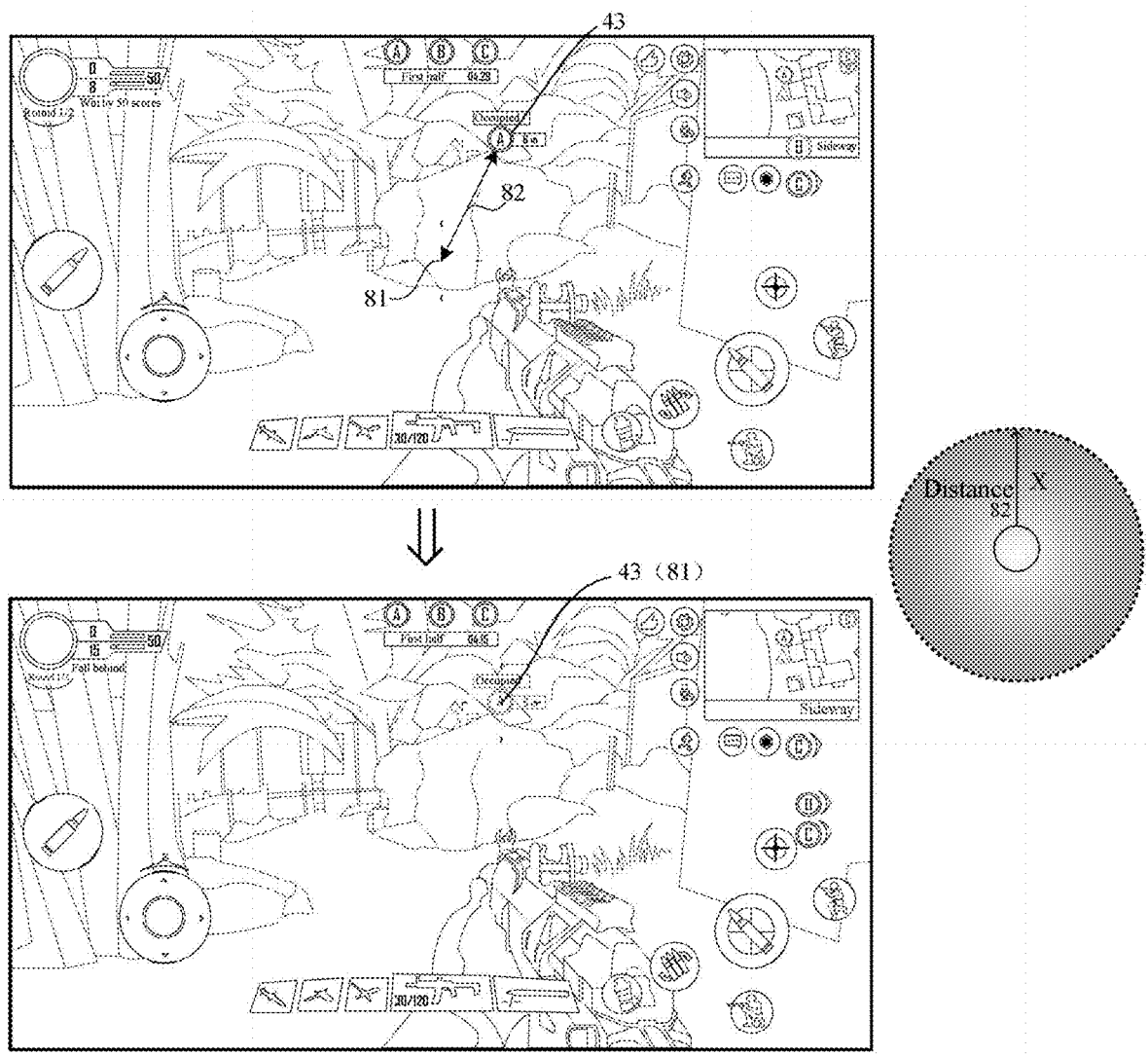
FIG. 8 is a schematic display diagram of a position prompt mark according to another embodiment of this application.

In some embodiments, if a distance between the aiming prompt mark and the position prompt mark changes, the terminal adjusts the transparency of the position prompt mark according to the changed distance between the aiming prompt mark and the position prompt mark. In some embodiments, as shown in FIG. 8, within a specific distance range (the distance range may be expressed as X), a smaller distance 82 between the aiming prompt mark 81 and the position prompt mark 43 leads to a larger transparency of the position prompt mark 43.

In some embodiments, the transparency of the position prompt mark is defined by the user.

Figure 9:
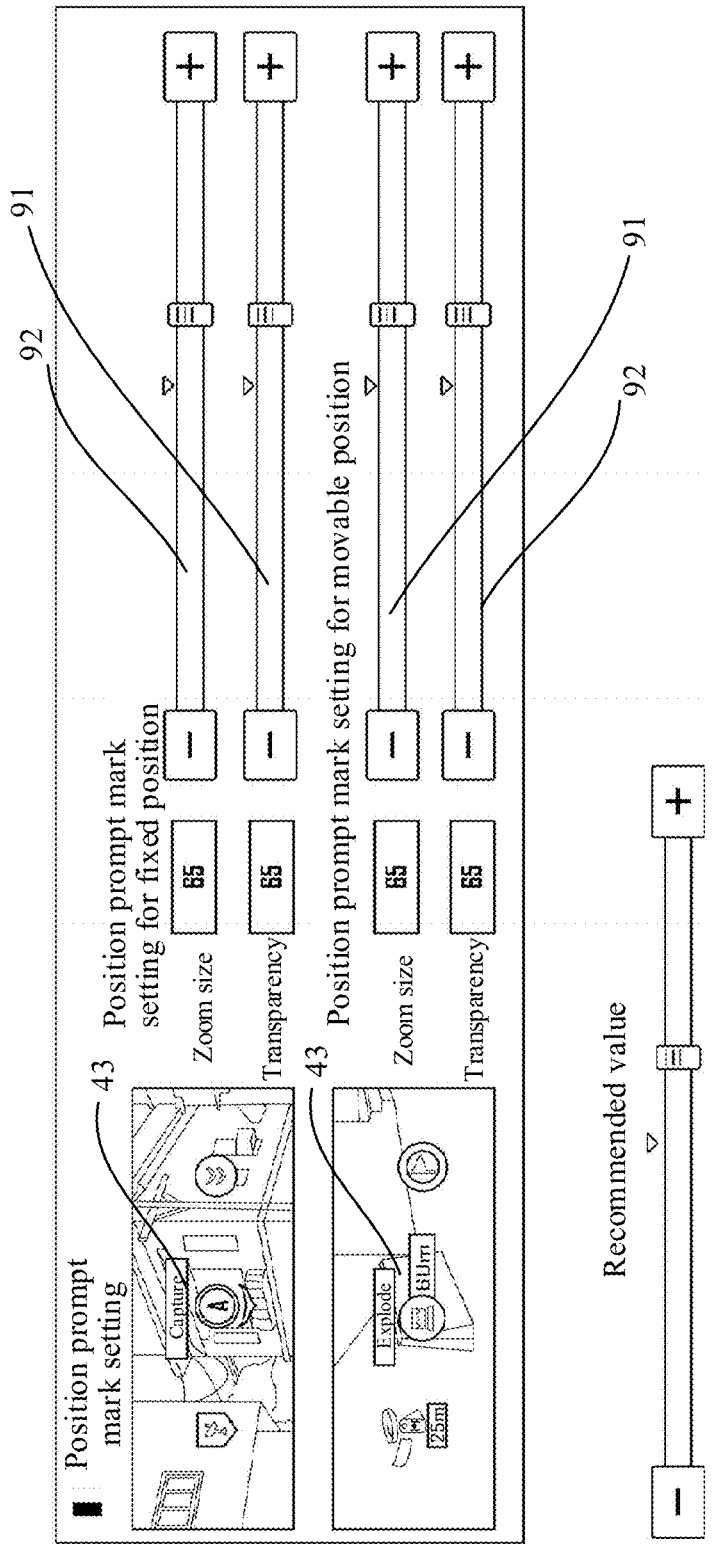
FIG. 9 is a schematic diagram of parameter setting according to an embodiment of this application.

In some embodiments, as shown in FIG. 9, the terminal receives a transparency setting operation 91 for the position prompt mark 43, and updates a maximum rated transparency value of the position prompt mark 43 or a minimum rated transparency value of the position prompt mark 43. In this implementation, the user may customize the maximum rated transparency value and/or the minimum rated transparency value through a setting interface, so that the transparency of the position prompt mark can satisfy personalized demands of the user more effectively.

In an example, the value range of the transparency is 0-100. A smaller transparency leads to a larger transparency degree. On the contrary, a larger transparency leads to a smaller transparency degree. For example, 0 means that the position prompt mark 43 is completely transparent, and 100 means that the position prompt mark 43 is completely opaque. In an example, the maximum rated transparency value is 100, and the minimum rated transparency value is 50. Certainly, the maximum rated transparency value and the minimum rated transparency value may be set to other values. This is not specifically limited in this embodiment of this application. For example, for the UI layer above the display picture of the virtual environment, a smaller transparency of the mark displayed on the UI layer leads to a larger transparency degree, and thereby leads to more clear display of the display picture of the virtual environment located under the mark through the mark. On the contrary, a smaller transparency leads to a larger transparency degree, and thereby leads to less possibility to display the display picture of the virtual environment located under the mark through the mark.

In some embodiments, the method further includes the following steps:

1. Receive a setting operation for the maximum rated transparency value, and update the maximum rated transparency value.

2. Automatically update the minimum rated transparency value, such that a difference between the maximum rated transparency value and the minimum rated transparency value is kept equal to a preset difference value.

In an example, the preset difference value is 50, and the user sets the maximum rated transparency value to 70. Therefore, the minimum rated transparency value is automatically updated to 20.

In some embodiments, the preset maximum rated transparency value is 100. In some embodiments, the preset difference is 40, 50, 60, 70, or the like. The specific value of the preset difference value is set by the relevant technical personnel according to an actual situation. This is not specifically limited in this embodiment of this application.

In this implementation, when determining the maximum rated transparency value and the minimum rated transparency value, the user is merely required to set the maximum rated transparency value. The terminal subtracts the preset difference from the updated maximum rated transparency value to obtain the minimum rated transparency value, and the user is not required to set the minimum rated transparency value. Therefore, the operation steps are reduced for the user, and the operation setting convenience is improved.

In some embodiments, as shown in FIG. 9, a size setting operation 92 for the position prompt mark is received, and a size of the position prompt mark is updated. In this way, the display size of the position prompt mark can satisfy the personalized demands of different users. In some embodiments, a value of the size of the position prompt mark is 100 by default.

Based on the above, in the technical solutions provided in this embodiment of this application, the transparency of the position prompt mark is adjusted when the relative positions between the aiming prompt mark and the position prompt mark change, an adjustment direction of the transparency being the same as a change direction of the distance between the aiming prompt mark and the position prompt mark. Therefore, when recognizing the display picture of the virtual environment overlapping the position prompt mark, the user can easily recognize the blocked display picture through the position prompt mark having a smaller transparency value (a larger transparency degree). In addition, since the interface display clarity and the display effect are improved, the time required for the user to acquire information in the virtual environment is reduced, and the efficiency of acquiring the information by the user is improved. Moreover, displaying the position prompt mark relatively far away from the aiming prompt mark with a relatively high transparency value can help the user determine the direction of the target environment position in the virtual environment and provide effective prompt to the user.

In addition, in the technical solution provided in this embodiment of this application, the transparency of the position prompt mark is dynamically adjusted according to the actual situation (such as the relative positions between the aiming prompt mark and the position prompt mark), and the position prompt mark is highlighted as required, and is not highlighted when more important information (such as the aiming prompt mark) exists. In this way, the display effect with adaptively changed interface content is realized. In addition, highlighting the key content ensures that the user can timely recognize the display information blocked by the position prompt mark or displayed near the position prompt mark.

Figure 10:
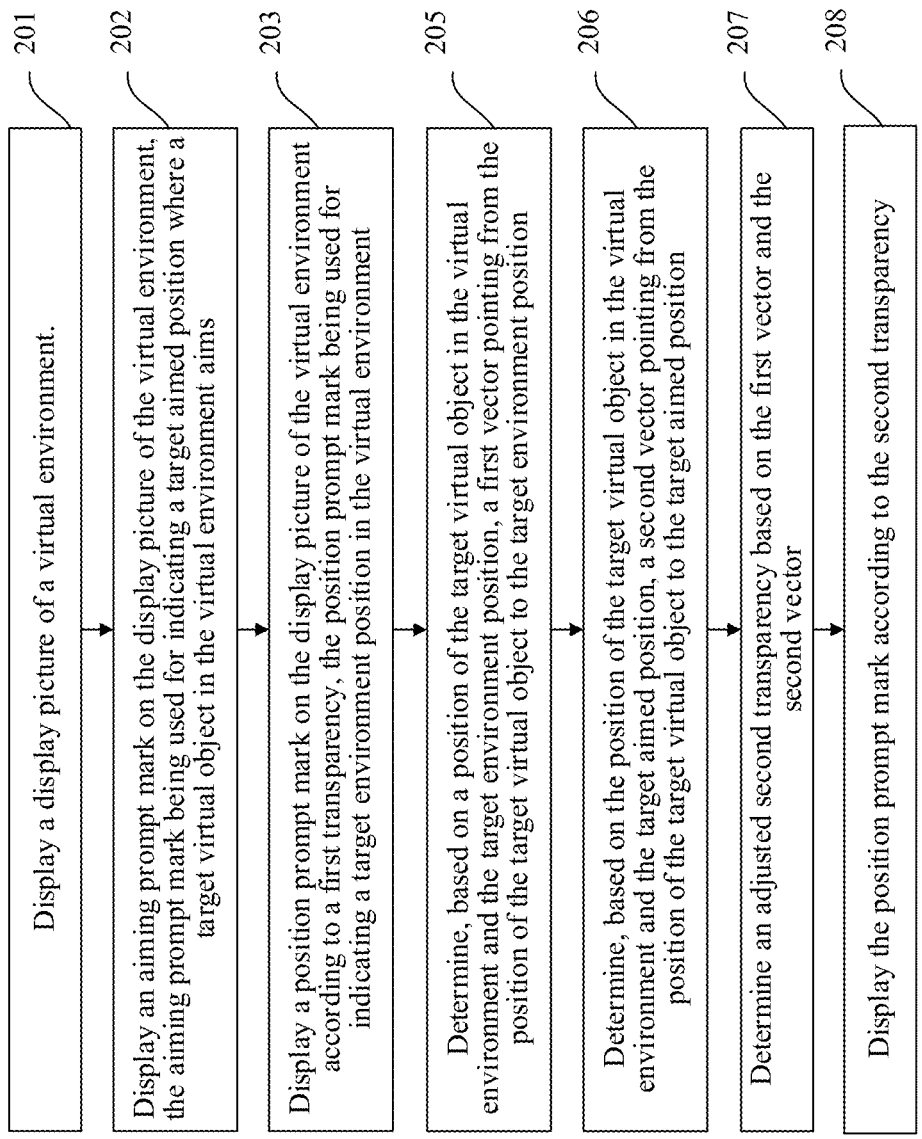
FIG. 10 is a flowchart of a mark processing method according to another embodiment of this application.

In some possible implementations, as shown in FIG. 10, step 204 in the above embodiment of FIG. 2 may be replaced with the following steps (205-208):

Step 205: Determine, based on a position of the target virtual object in the virtual environment and the target environment position, a first vector pointing from the position of the target virtual object to the target environment position.

In some embodiments, a first coordinate system is established in the virtual environment. When the virtual environment is a three-dimensional virtual environment, the first coordinate system is a control coordinate system. Coordinates respectively corresponding to the target virtual object and the target environment position in the first coordinate system are acquired, and the first vector is determined based on the respective coordinates of the target virtual object and the target environment position in the first coordinate system.

In other embodiments, a second coordinate system is established by using the target virtual object as an origin, and coordinates of the target environment position in the second coordinate system are acquired. The coordinates are the first vector.

Step 206: Determine, based on the position of the target virtual object in the virtual environment and the target aimed position, a second vector pointing from the position of the target virtual object to the target aimed position.

In some embodiments, coordinates of the target aimed position in the first coordinate system are acquired, and the second vector is determined based on the coordinates respectively corresponding to the target virtual object and the target aimed position in the first coordinate system.

In other embodiments, coordinates of the target aimed position in the second coordinate system are acquired. The coordinates are the second vector.

Step 207: Determine an adjusted second transparency based on the first vector and the second vector.

In some embodiments, an included angle between the first vector and the second vector is determined based on the first vector and the second vector determined based on the same coordinate system, and the second transparency is determined according to the included angle or a value of the included angle calculated based on a trigonometric function.

In some embodiments, step 207 includes the following sub-steps.

1. Determine a cosine value of an included angle between the first vector and the second vector.
2. Determine that the second transparency is a maximum rated transparency when the cosine value is less than or equal to a first threshold.
3. Determine the second transparency based on the cosine value when the cosine value is greater than the first threshold and less than or equal to a second threshold, the second transparency being less than the maximum rated transparency and negatively correlated with the cosine value.

In this embodiment of this application, a value range of the included angle between the first vector and the second vector is 0°-180°. Within the value range, a unique correspondence exists between the included angle and the cosine value.

In some embodiments, when the field of view is 180°, if the cosine value is less than 0, which indicates that the target environment position is outside the field of view, the terminal displays the position prompt mark on the edge of the display picture of the virtual environment.

In some embodiments, the first vector and the second vector are unit vectors, and a dot product of the first vector and the second vector is the cosine value. When the cosine value is less than the first threshold, a larger included angle leads to a larger display distance between the aiming prompt mark and the position prompt mark. In this case, the terminal may display the position prompt mark according to the maximum rated transparency. When the cosine value is greater than the first threshold and less than the second threshold, a smaller included angle leads to a smaller display distance between the aiming prompt mark and the position prompt mark. In this case, the terminal displays the position prompt mark according to a transparency less than the maximum rated transparency value.

When the cosine value is greater than the first threshold and less than the second threshold, the second transparency is negatively correlated with the cosine value. That is to say, a larger cosine value leads to a smaller second transparency, and a smaller cosine value leads to a larger second transparency. In some embodiments, when the cosine value is greater than the first threshold and less than the second threshold, the second transparency is linearly negatively correlated with the cosine value.

In some embodiments, the first threshold is 0.2, 0.3, 0.4, 0.5, or the like. The specific value of the first threshold is set by the relevant technical personnel according to an actual situation. This is not specifically limited in this embodiment of this application. In some embodiments, the second threshold is 0.6, 0.7, 0.8, 1, or the like. The specific value of the second threshold is set by the relevant technical personnel according to an actual situation. This is not specifically limited in this embodiment of this application. The second threshold is greater than the first threshold.

In some embodiments, it is determined that the second transparency is a minimum rated transparency when the cosine value is greater than the second threshold. When the cosine value is greater than the second threshold, it indicates that the display distance between the aiming prompt mark and the position prompt mark is very small. Within the range, the terminal may display the position prompt mark according to the minimum rated transparency.

Due to the unique correspondence between the included angle and the cosine value in this embodiment of this application, obviously, the second transparency may be determined directly based on the included angle.

In other embodiments, the step 207 includes the following sub-steps.

1. Determine an included angle between the first vector and the second vector.

2. Determine that the second transparency is a maximum rated transparency value when the included angle is greater than a third threshold.

3. Determine that the second transparency is less than the maximum rated transparency value when the included angle is less than the third threshold and greater than a fourth threshold, the second transparency being positively correlated with the included angle.

In some embodiments, the included angle between the first vector and the second vector is determined based on the above calculated cosine value. When the included angle is greater than the third threshold, the display distance between the aiming prompt mark and the position prompt mark is relatively large. In this case, the terminal may display the position prompt mark according to the maximum rated transparency. When the included angle is less than the third threshold and greater than a fourth threshold, the display distance between the aiming prompt mark and the position prompt mark is relatively small. In this case, the terminal may display the position prompt mark according to a transparency less than the maximum rated transparency value.

When the included angle is less than the third threshold and greater than the fourth threshold, the second transparency is positively correlated with the included angle. That is to say, a smaller included angle leads to a smaller second transparency, and a larger included angle leads to a larger second transparency. In some embodiments, when the included angle is less than the third threshold and greater than the fourth threshold, the second transparency is linearly positively correlated with the included angle.

In some embodiments, the third threshold is 30°, 45°, 60°, 90°, or the like. The specific value of the third threshold is set by the relevant technical personnel according to an actual situation. This is not specifically limited in this embodiment of this application. In some embodiments, the fourth threshold is 70°, 80°, 90°, or the like. The specific value of the fourth threshold is set by the relevant technical personnel according to an actual situation. This is not specifically limited in this embodiment of this application. The third threshold is greater than the fourth threshold.

Step 208: Display the position prompt mark according to the second transparency.

Based on the above, in this implementation, the terminal may determine the second transparency through the position of the target virtual object in the virtual environment, the target aimed position, and the target environment position, and display the position prompt mark according to the second transparency. The calculation process is relatively simple, which reduces processing overheads required for displaying the position prompt mark and avoids a resource waste of the terminal.

Figure 11:
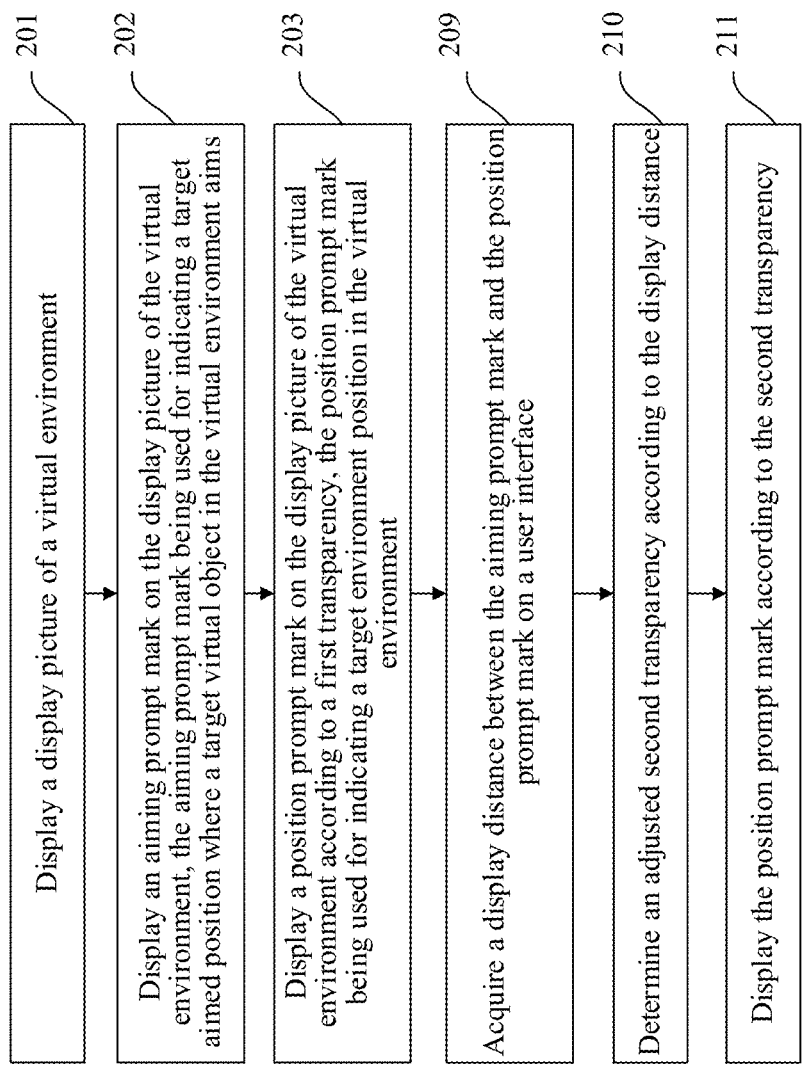
FIG. 11 is a flowchart of a mark processing method according to another embodiment of this application.

In other possible implementations, as shown in FIG. 11, step 204 in the above embodiment of FIG. 2 may be replaced with the following steps (209-211):

Step 209: Acquire a display distance between the aiming prompt mark and the position prompt mark on a user interface.

In some embodiments, the terminal may acquire the display distance through a relevant data interface of the target application. In other embodiments, the terminal may acquire a screenshot of a current user interface through screen shot to acquire the display distance.

In some embodiments, the aiming prompt mark and the position prompt mark are marks that occupy a specific area. In an example, the display distance is a shortest linear distance between the aiming prompt mark and the position prompt mark. In this example, when the aiming prompt mark and the position prompt mark are in contact with each other or have an overlapping display region, the display distance is 0. In another example, the display distance is a distance between the center of the aiming prompt mark and the center of the position prompt mark. In this example, when the center of the aiming prompt mark and the center of the position prompt mark are displayed in an overlap manner, the display distance is 0.

In some embodiments, the terminal may represent the display distance by using a quantity of pixels between the aiming prompt mark and the position prompt mark.

In some implementations, the display distance is the linear distance between the aiming prompt mark and the position prompt mark. In some implementations, the display distance is a ratio of the linear distance between the aiming prompt mark and the position prompt mark to a length/width/diagonal length of the user interface.

Step 210: Determine the adjusted second transparency according to the display distance.

In some embodiments, the terminal may determine the second transparency through a preset relationship between the display distance and the second transparency.

In some embodiments, step 210 includes the following sub-steps:

1. Determine that the second transparency is a maximum rated transparency when the display distance is greater than a first distance threshold.

2. Determine the second transparency based on the display distance when the display distance is less than or equal to the first distance threshold and greater than a second distance threshold, the second transparency being less than the maximum rated transparency and positively correlated with the display distance.

In some embodiments, when the display distance is greater than the first distance threshold, the aiming prompt mark is relatively far from the position prompt mark. In this case, the terminal may display the position prompt mark according to the maximum rated transparency. When the display distance is less than or equal to the first distance threshold and greater than the second distance threshold, the aiming prompt mark is relatively close to the position prompt mark. In this case, the terminal may display the position prompt mark according to a transparency less than the maximum rated transparency value.

When the display distance is less than or equal to the first distance threshold and greater than the second distance threshold, the second transparency is positively correlated with the display distance, that is, a smaller display distance leads to a smaller second transparency, and a larger display distance leads to a larger second transparency. In some embodiments, when the display distance is less than or equal to the first distance threshold and greater than the second distance threshold, the second transparency is linearly positively correlated with the display distance.

In some embodiments, specific values of the first distance threshold and the second distance threshold are set by the relevant technical personnel according to an actual situation. This is not specifically limited in this embodiment of this application. The first distance threshold is greater than the second distance threshold.

In some embodiments, it is determined that the second transparency is a minimum rated transparency when the display distance is less than or equal to the second distance threshold. When the display distance is less than or equal to the second distance threshold, it means that the aiming prompt mark is very close to the position prompt mark. Within the range, the terminal may display the position prompt mark according to the minimum rated transparency.

Step 211: Display the position prompt mark according to the second transparency.

Based on the above, in this implementation, the terminal can directly determine the second transparency through the display distance between the aiming prompt mark and the position prompt mark without a need to acquire the position of the target virtual object, which further simplifies the calculation process, thereby further reducing the processing overheads required for displaying the position prompt mark and avoiding the resource waste of the terminal.

In some embodiments, the terminal may map the target environment position to the display screen through a world to screen point function of a scene camera, and determine the corresponding display position of the target environment position on the display screen. The scene camera is a virtual camera for determining the virtual picture of the virtual environment. Then the terminal determines the display position of the position prompt mark in the UI layer based on a screen point to local point in rectangle function of a UI camera. The UI camera is configured to determine a UI element displayed in the UI layer.

Figure 12:
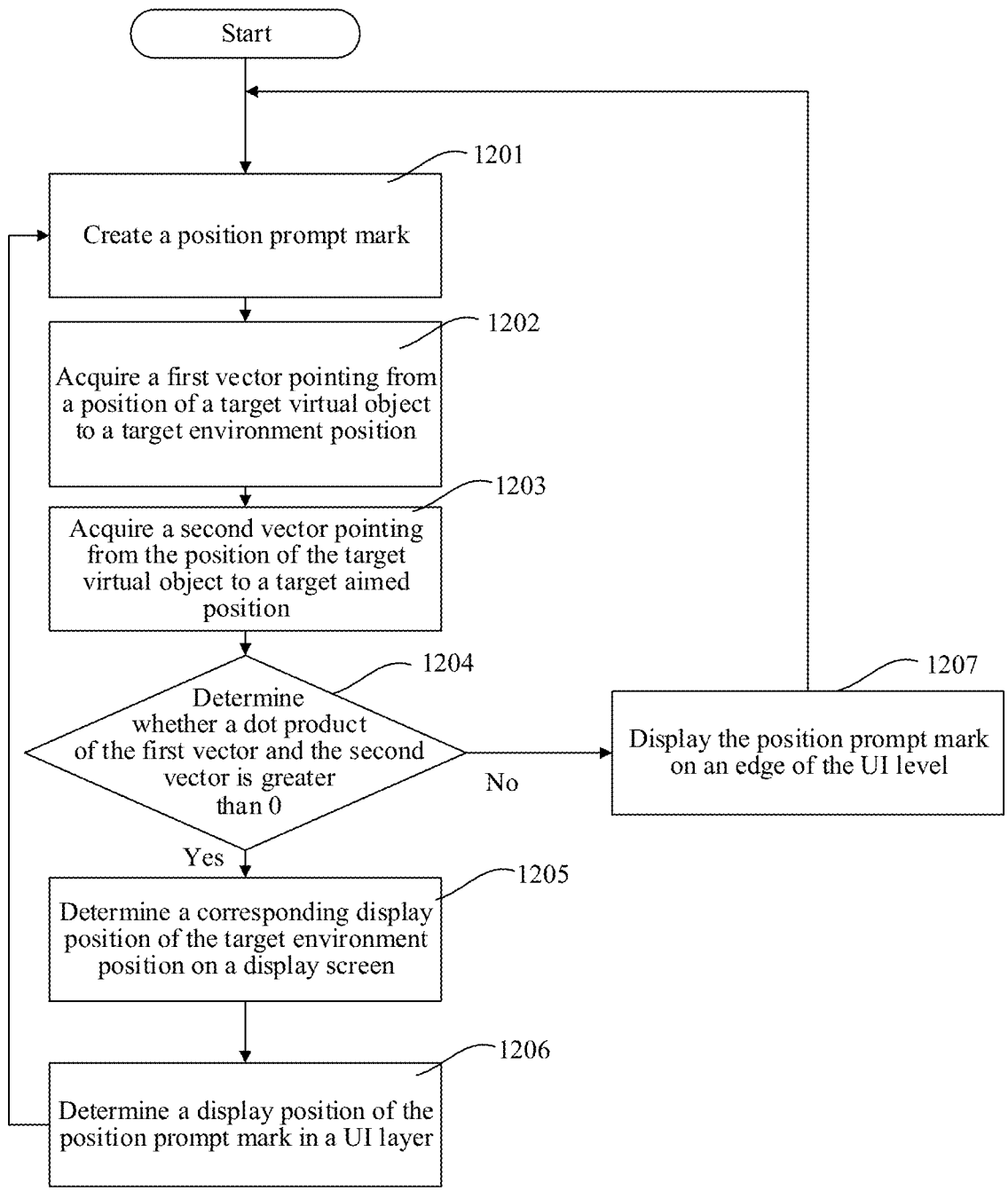
FIG. 12 is a flowchart of a mark processing method according to another embodiment of this application.

As shown in FIG. 12, the mark processing method is briefly described by using an example that the horizontal angle of the field of view is 180°. The method includes the following steps (1201-1207):

Step 1201: Create a position prompt mark.

Step 1202: Acquire a first vector pointing from a position of a target virtual object to a target environment position.

Step 1203: Acquire a second vector pointing from the position of the target virtual object to a target aimed position.

Step 1204: Determine whether a dot product of the first vector and the second vector is greater than 0; if so, perform step 1205; and if not, perform step 1207.

Step 1205: Determine a corresponding display position of the target environment position on a display screen.

Step 1206: Determine a display position of the position prompt mark in a UI layer, and perform step 1202.

Step 1207: Display the position prompt mark on an edge of the UI layer, and perform step 1202.

Figure 13:
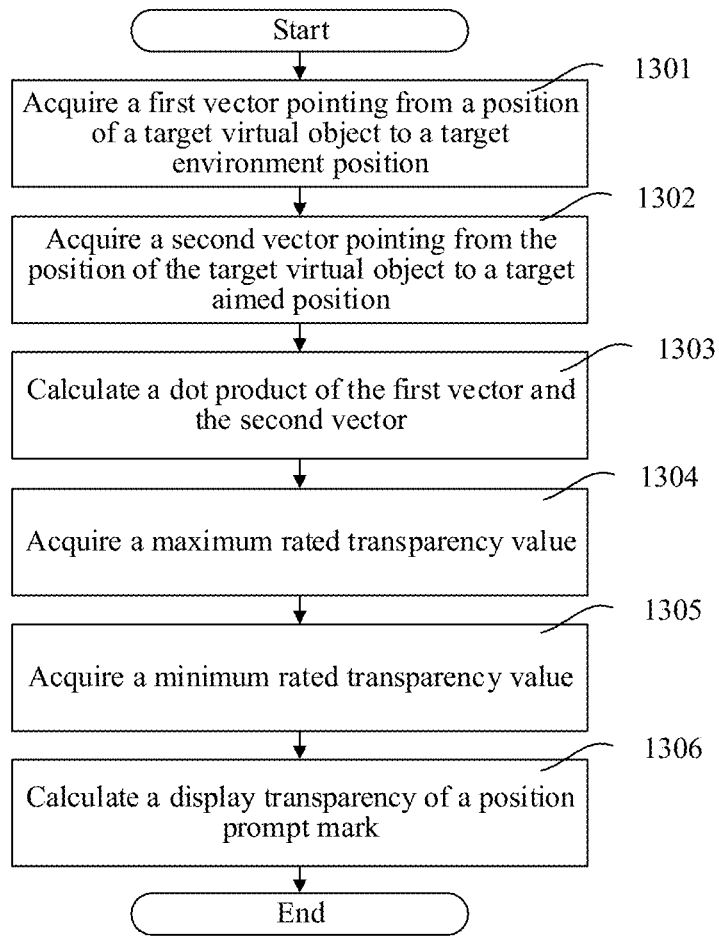
FIG. 13 is a flowchart of a mark processing method according to another embodiment of this application.

In some embodiments, as shown in FIG. 13, the mark processing method includes the following steps (1301-1306):

Step 1301: Acquire a first vector pointing from a position of a target virtual object to a target environment position.

Step 1302: Acquire a second vector pointing from the position of the target virtual object to a target aimed position.

Step 1303: Calculate a dot product of the first vector and the second vector.

Step 1304: Acquire a maximum rated transparency value.

Step 1305: Acquire a minimum rated transparency value.

Step 1306: Calculate a display transparency of a position prompt mark.

The following describes apparatus embodiments of this application, which can be used for executing the method embodiments of this application. For details not disclosed in the apparatus embodiments of this application, refer to the method embodiments of this application.

Figure 14:
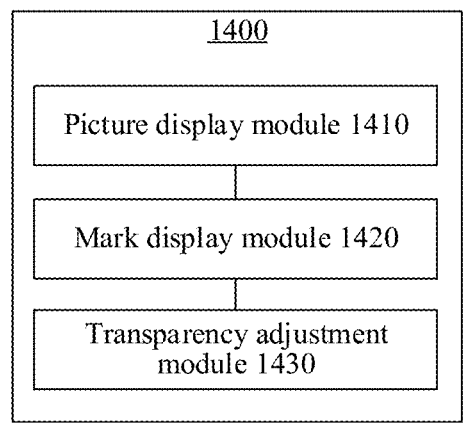
FIG. 14 is a schematic structural diagram of a mark processing apparatus according to an embodiment of this application.

FIG. 14 is a block diagram of a mark processing apparatus according to an embodiment of this application. The apparatus has a function of implementing examples of the foregoing mark processing method, and the function may be achieved by hardware or by hardware executing corresponding software. The apparatus has a function of implementing examples of the foregoing mark processing method, and the function may be achieved by hardware or by hardware executing corresponding software. The apparatus 1400 may include a picture display module 1410, a mark display module 1420, and a transparency adjustment module 1430.

The picture display module 1410 is configured to display a display picture of a virtual environment.

The mark display module 1420 is configured to display an aiming prompt mark on the display picture of the virtual environment, the aiming prompt mark being used for indicating a target aimed position at which a target virtual object in the virtual environment aims.

The mark display module 1420 is further configured to display a position prompt mark on the display picture of the virtual environment according to a first transparency, the position prompt mark being used for indicating a target environment position in the virtual environment.

The transparency adjustment module 1430 is configured to adjust the transparency of the position prompt mark in response to a change in relative positions between the aiming prompt mark and the position prompt mark.

Based on the above, in the technical solutions provided in this embodiment of this application, the transparency of the position prompt mark is adjusted when the relative positions between the aiming prompt mark and the position prompt mark change. Therefore, when recognizing the display picture of the virtual environment overlapping the position prompt mark, the user can easily recognize the blocked display picture through the position prompt mark having a smaller transparency. In addition, since the interface display clarity and the display effect are improved, the time required for the user to acquire information in the virtual environment is reduced, and the efficiency of acquiring the information by the user is improved.

Figure 15:
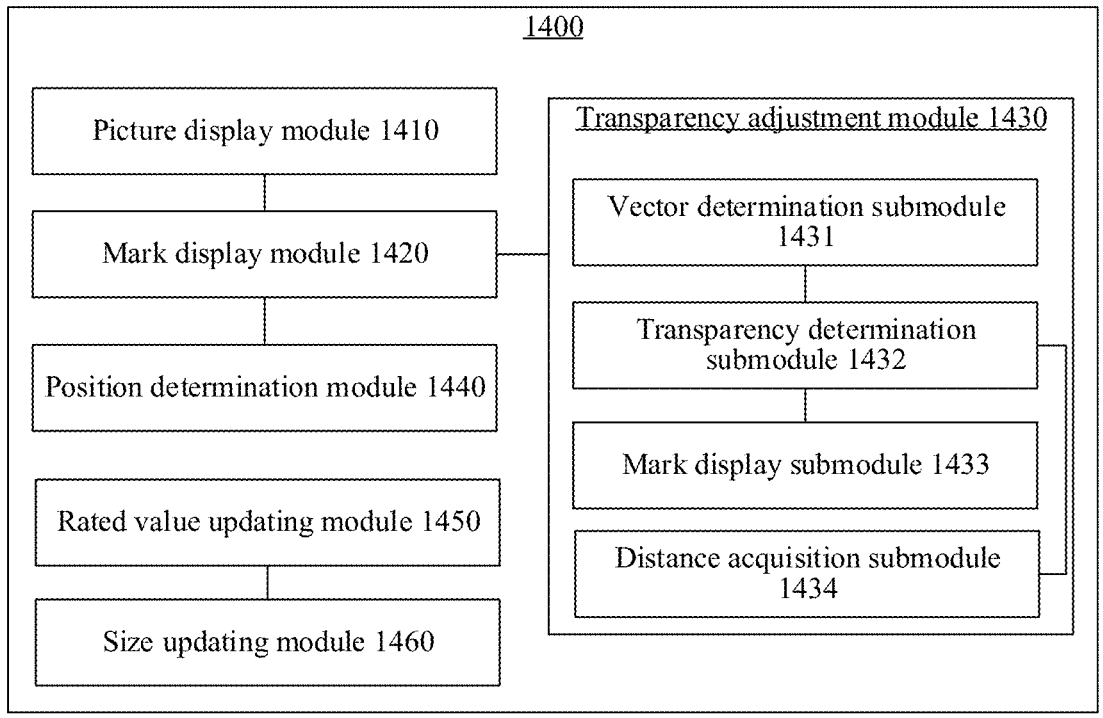
FIG. 15 is a schematic structural diagram of a mark processing apparatus according to another embodiment of this application.

In some embodiments, as shown in FIG. 15, the transparency adjustment module 1430 includes a vector determination submodule 1431, a transparency determination submodule 1432, and a mark display submodule 1433.

The vector determination submodule 1431 is configured to determine, based on a position of the target virtual object in the virtual environment and the target environment position, a first vector pointing from the position of the target virtual object to the target environment position.

The vector determination submodule 1431 is further configured to determine, based on the position of the target virtual object in the virtual environment and the target aimed position, a second vector pointing from the position of the target virtual object to the target aimed position.

The transparency determination submodule 1432 is configured to determine an adjusted second transparency based on the first vector and the second vector.

The mark display submodule 1433 is configured to display the position prompt mark according to the second transparency.

In some embodiments, as shown in FIG. 15, the transparency determination submodule 1432 is configured to:
determine a cosine value of an included angle between the first vector and the second vector;
determine that the second transparency is a maximum rated transparency when the cosine value is less than or equal to a first threshold; and
determine the second transparency based on the cosine value when the cosine value is greater than the first threshold and less than a second threshold, the second transparency being less than the maximum rated transparency and negatively correlated with the cosine value.

In some embodiments, as shown in FIG. 15, the transparency determination submodule 1432 is configured to:
determine that the second transparency is a minimum rated transparency when the cosine value is greater than the second threshold.

In some embodiments, as shown in FIG. 15, the transparency adjustment module 1430 includes a distance acquisition submodule 1434.

The distance acquisition submodule 1434 is configured to acquire a display distance between the aiming prompt mark and the position prompt mark on a user interface.

The transparency determination submodule 1432 is further configured to determine an adjusted second transparency according to the display distance.

The mark display submodule 1433 is further configured to display the position prompt mark according to the second transparency.

In some embodiments, as shown in FIG. 15, the transparency determination submodule 1432 is configured to:
determine that the second transparency is a maximum rated transparency when the display distance is greater than a first distance threshold; and
determine the second transparency based on the display distance when the display distance is less than the first distance threshold and greater than a second distance threshold, the second transparency being less than the maximum rated transparency and positively correlated with the display distance.

In some embodiments, as shown in FIG. 15, the transparency determination submodule 1432 is configured to:
determine that the second transparency is a minimum rated transparency when the display distance is less than a second distance threshold.

In some embodiments, as shown in FIG. 15, the apparatus 1400 further includes a position determination module 1440.

The position determination module 1440 is configured to determine whether the target environment position is within a field of view of the target virtual object, the field of view being used for indicating a virtual environment region currently observed by the target virtual object.

The mark display module 1420 is further configured to display the position prompt mark at the target environment position when the target environment position is within the field of view.

The mark display module 1420 is further configured to display the position prompt mark on an edge of the display picture of the virtual environment when the target environment position is outside the field of view.

In some embodiments, as shown in FIG. 15, the mark display module 1420 is configured to:
display the position prompt mark on a left edge of the display picture of the virtual environment when the target environment position is outside the field of view and the target environment position is located in a left region of the target virtual object; and
display the position prompt mark on a right edge of the display picture of the virtual environment when the target environment position is outside the field of view and the target environment position is located in a right region of the target virtual object.

In some embodiments, the position prompt mark includes a direction mark, the direction mark pointing to the target environment position.

In some embodiments, as shown in FIG. 15, the apparatus 1400 further includes a rated value updating module 1450 and a size updating module 1460.

The rated value updating module 1450 is configured to receive a transparency setting operation for the position prompt mark, and update a maximum rated transparency value of the position prompt mark and/or a minimum rated transparency value of the position prompt mark.

The size updating module 1460 is configured to receive a size setting operation for the position prompt mark, and update a size of the position prompt mark.

In some embodiments, as shown in FIG. 15, the rated value updating module 1450 is configured to:
receive a setting operation for the maximum rated transparency value, and update the maximum rated transparency value; and
automatically update the minimum rated transparency value, such that a difference between the maximum rated transparency value and the minimum rated transparency value is kept equal to a preset difference value.

When the apparatus provided in the foregoing embodiments implements functions of the apparatus, the division of the foregoing functional modules is only an example for description. In an actual application, the functions may be assigned to and completed by different functional modules as required, that is, the internal structure of the device is divided into different functional modules, to implement all or some of the functions described above. In addition, the apparatus and method embodiments provided in the foregoing embodiments belong to the same conception. For the specific implementation process, reference may be made to the method embodiments, and details are not described herein again.

Figure 16:
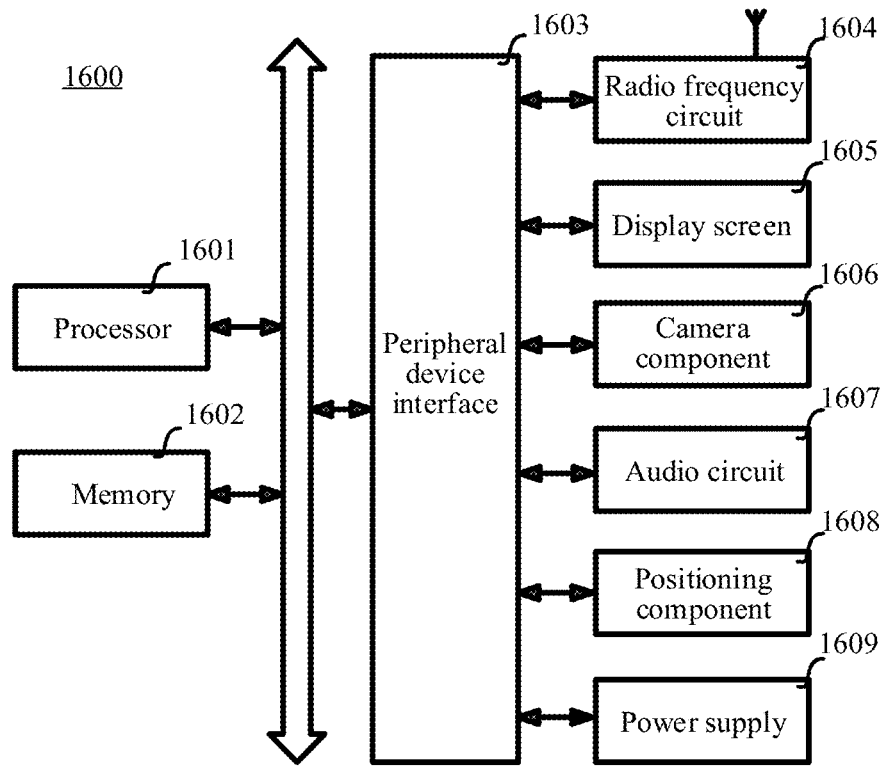
FIG. 16 is a schematic structural diagram of a computer device according to an embodiment of this application.

FIG. 16 is a schematic structural diagram of a computer device according to an embodiment of this application. The computer device may be the terminal 11 or the server 12 described in FIG. 1. Referring to FIG. 16, an example in which the computer device is used as the terminal is used for description. The terminal 1600 may be an electronic device such as a mobile phone, a tablet computer, a game console, an ebook reader, a multimedia player, a wearable device, or a PC. The terminal is configured to implement the mark processing method provided in the above embodiment. The terminal may be the terminal 11 in the implementation environment shown in FIG. 1. Specifically,
the terminal 1600 generally includes: a processor 1601 and a memory 1602.

The processor 1601 may include one or more processing cores. For example, the processor 1601 may be a 4-core processor or an 8-core processor. The processor 1601 may be implemented by using at least one hardware form of a digital signal processor (DSP), a field programmable gate array (FPGA), and a programmable logic array (PLA). The processor 1601 further includes a main processor and a coprocessor. The main processor is configured to process data in an active state, also referred to as a central processing unit (CPU). The coprocessor is a low-power consumption processor configured to process data in a standby state. In some embodiments, the processor 1601 may be integrated with a graphics processing unit (GPU). The GPU is configured to be responsible for rendering and drawing content that a display needs to display. In some embodiments, the processor 1601 may further include an artificial intelligence (AI) processor. The AI processor is configured to process a computing operation related to machine learning.

The memory 1602 may include one or more computer-readable storage media. The computer-readable storage media may be non-transitory. The memory 1602 may further include a high-speed random access memory and a non-transitory memory, for example, one or more disk storage devices or flash memory devices. In some embodiments, the non-transitory computer-readable storage medium in the memory 1602 is configured to store at least one instruction, at least one program, a code set, or an instruction set, the at least one instruction, the at least one program, the code set, or the instruction set being configured to be executed by one or more processors to implement the foregoing mark processing method.

In some embodiments, the terminal 1600 includes: a peripheral device interface 1603 and at least one peripheral device. The processor 1601, the memory 1602, and the peripheral device interface 1603 may be connected through a bus or a signal cable. Each peripheral device may be connected to the peripheral device interface 1603 through a bus, a signal cable, or a circuit board. Specifically, the peripheral device includes: at least one of a radio frequency circuit 1604, a display screen 1605, a camera assembly 1606, an audio circuit 1607, a positioning assembly 1608, and a power supply 1609.

A person skilled in the art may understand that a structure shown in FIG. 16 constitutes no limitation on the terminal 1600, and the terminal may include more or fewer components than those shown in the figure, or combine some components, or use a different component deployment.

In an exemplary embodiment, a computer-readable storage medium is further provided, the storage medium storing at least one instruction, at least one program, a code set, or an instruction set, the at least one instruction, the at least one program, the code set, or the instruction set, when executed by the processor, implementing the foregoing mark processing method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing mark processing method.

It is to be understood that "plurality of" mentioned in this specification means two or more. And/or describes an association relationship for describing associated objects and represents that three relationships may exist. For example, A and/or B may represent the following three cases: only A exists, both A and B exist, and only B exists. The character "/" generally indicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A mark processing method, performed by a computer device, the method comprising:
    displaying an aiming prompt mark on a display picture of a virtual environment, the aiming prompt mark being used for indicating a target aimed position at which a target virtual object in the virtual environment aims using a virtual weapon;
    displaying a position prompt mark on the display picture of the virtual environment according to a transparency, the position prompt mark being used for indicating a target environment position in the virtual environment at which the target virtual object in the virtual environment plans to attack using the virtual weapon and the transparency is defined according to a distance between the aiming prompt mark and the position prompt mark; and
    adjusting the transparency of the position prompt mark in response to a change in relative positions between the aiming prompt mark and the position prompt mark, further including:
        increasing the transparency of the position prompt mark in the virtual environment when a distance between the aiming prompt mark and the position prompt mark decreases; and
        decreasing the transparency of the position prompt mark in the virtual environment when the distance between the aiming prompt mark and the position prompt mark increases.

2. The method according to claim 1, wherein the adjusting the transparency of the position prompt mark in response to a change in relative positions between the aiming prompt mark and the position prompt mark comprises:
    determining, based on a position of the target virtual object in the virtual environment and the target environment position, a first vector pointing from the position of the target virtual object to the target environment position;
    determining, based on the position of the target virtual object in the virtual environment and the target aimed position, a second vector pointing from the position of the target virtual object to the target aimed position;

determining an adjusted second transparency based on the first vector and the second vector; and displaying the position prompt mark according to the second transparency.

3. The method according to claim 1, wherein the adjusting the transparency of the position prompt mark in response to a change in relative positions between the aiming prompt mark and the position prompt mark comprises:

acquiring a display distance between the aiming prompt mark and the position prompt mark on a user interface;

determining an adjusted second transparency according to a preset relationship between the display distance and the second transparency; and displaying the position prompt mark according to the second transparency.

4. The method according to claim 1, further comprising:

determining whether the target environment position is within a field of view of the target virtual object, the field of view being used for indicating a virtual environment region currently observed by the target virtual object;

displaying the position prompt mark at the target environment position when the target environment position is within the field of view; and displaying the position prompt mark on an edge of the display picture of the virtual environment when the target environment position is outside the field of view.

5. The method according to claim 1, wherein the position prompt mark comprises a direction mark, the direction mark pointing to the target environment position.

6. The method according to claim 1, further comprising:

receiving a transparency setting operation for the position prompt mark, and updating at least one of a maximum rated transparency value of the position prompt mark or a minimum rated transparency value of the position prompt mark.

7. The method according to claim 1, further comprising:

receiving a size setting operation for the position prompt mark, and updating a size of the position prompt mark.

8. A computer device, comprising a memory and one or more processors, the memory storing computer-readable instructions, the computer-readable instructions, when executed by the one or more processor, causing the computer device to implement a mark processing method including:

displaying an aiming prompt mark on a display picture of a virtual environment, the aiming prompt mark being used for indicating a target aimed position at which a target virtual object in the virtual environment aims using a virtual weapon;

displaying a position prompt mark on the display picture of the virtual environment according to a transparency, the position prompt mark being used for indicating a target environment position in the virtual environment at which the target virtual object in the virtual environment plans to attack using the virtual weapon and the transparency is defined according to a distance between the aiming prompt mark and the position prompt mark; and adjusting the transparency of the position prompt mark in response to a change in relative positions between the aiming prompt mark and the position prompt mark, further including:

increasing the transparency of the position prompt mark in the virtual environment when a distance between the aiming prompt mark and the position prompt mark decreases; and decreasing the transparency of the position prompt mark in the virtual environment when the distance between the aiming prompt mark and the position prompt mark increases.

9. The computer device according to claim 8, wherein the adjusting the transparency of the position prompt mark in response to a change in relative positions between the aiming prompt mark and the position prompt mark comprises:

determining, based on a position of the target virtual object in the virtual environment and the target environment position, a first vector pointing from the position of the target virtual object to the target environment position;

determining, based on the position of the target virtual object in the virtual environment and the target aimed position, a second vector pointing from the position of the target virtual object to the target aimed position;

determining an adjusted second transparency based on the first vector and the second vector; and displaying the position prompt mark according to the second transparency.

10. The computer device according to claim 8, wherein the adjusting the transparency of the position prompt mark in response to a change in relative positions between the aiming prompt mark and the position prompt mark comprises:

acquiring a display distance between the aiming prompt mark and the position prompt mark on a user interface;

determining an adjusted second transparency according to a preset relationship between the display distance and the second transparency; and displaying the position prompt mark according to the second transparency.

11. The computer device according to claim 8, wherein the method further comprises:

determining whether the target environment position is within a field of view of the target virtual object, the field of view being used for indicating a virtual environment region currently observed by the target virtual object;

displaying the position prompt mark at the target environment position when the target environment position is within the field of view; and displaying the position prompt mark on an edge of the display picture of the virtual environment when the target environment position is outside the field of view.

12. The computer device according to claim 8, wherein the position prompt mark comprises a direction mark, the direction mark pointing to the target environment position.

13. The computer device according to claim 8, wherein the method further comprises:

receiving a transparency setting operation for the position prompt mark, and updating at least one of a maximum rated transparency value of the position prompt mark or a minimum rated transparency value of the position prompt mark.

14. The computer device according to claim 8, wherein the method further comprises:

receiving a size setting operation for the position prompt mark, and updating a size of the position prompt mark.

15. One or more non-transitory computer-readable storage media storing computer-readable instructions, the computer-readable instructions, when executed by one or more processors of a computer device, causing the computer device to implement a mark processing method including:

displaying an aiming prompt mark on a display picture of a virtual environment, the aiming prompt mark being used for indicating a target aimed position at which a target virtual object in the virtual environment aims using a virtual weapon;

displaying a position prompt mark on the display picture of the virtual environment according to a transparency, the position prompt mark being used for indicating a target environment position in the virtual environment at which the target virtual object in the virtual environment plans to attack using the virtual weapon and the transparency is defined according to a distance between the aiming prompt mark and the position prompt mark; and adjusting the transparency of the position prompt mark in response to a change in relative positions between the aiming prompt mark and the position prompt mark, further including:

increasing the transparency of the position prompt mark in the virtual environment when a distance between the aiming prompt mark and the position prompt mark decreases; and decreasing the transparency of the position prompt mark in the virtual environment when the distance between the aiming prompt mark and the position prompt mark increases.

16. The non-transitory computer-readable storage media according to claim 15, wherein the adjusting the transparency of the position prompt mark in response to a change in relative positions between the aiming prompt mark and the position prompt mark comprises:

determining, based on a position of the target virtual object in the virtual environment and the target environment position, a first vector pointing from the position of the target virtual object to the target environment position;

determining, based on the position of the target virtual object in the virtual environment and the target aimed position, a second vector pointing from the position of the target virtual object to the target aimed position;

determining an adjusted second transparency based on the first vector and the second vector; and displaying the position prompt mark according to the second transparency.

17. The non-transitory computer-readable storage media according to claim 15, wherein the adjusting the transparency of the position prompt mark in response to a change in relative positions between the aiming prompt mark and the position prompt mark comprises:

acquiring a display distance between the aiming prompt mark and the position prompt mark on a user interface;

determining an adjusted second transparency according to a preset relationship between the display distance and the second transparency; and displaying the position prompt mark according to the second transparency.

18. The non-transitory computer-readable storage media according to claim 15, wherein the method further comprises:

determining whether the target environment position is within a field of view of the target virtual object, the field of view being used for indicating a virtual environment region currently observed by the target virtual object;

displaying the position prompt mark at the target environment position when the target environment position is within the field of view; and displaying the position prompt mark on an edge of the display picture of the virtual environment when the target environment position is outside the field of view.

19. The non-transitory computer-readable storage media according to claim 15, wherein the position prompt mark comprises a direction mark, the direction mark pointing to the target environment position.

20. The non-transitory computer-readable storage media according to claim 15, wherein the method further comprises:

receiving a transparency setting operation for the position prompt mark, and updating at least one of a maximum rated transparency value of the position prompt mark or a minimum rated transparency value of the position prompt mark.

* * * * *